United States Patent [19]

Shimizu et al.

[11] Patent Number: 4,500,668
[45] Date of Patent: Feb. 19, 1985

[54] RESIN COMPOSITION FOR MOLDING MATERIALS

[75] Inventors: Senzo Shimizu, Odawara; Isao Nomura, Hiratsuka; Kazuo Yamamiya, Chigasaki; Tsuneaki Masuda, Hiratsuka, all of Japan

[73] Assignee: Mitsubishi Gas Chemical Company, Inc., Tokyo, Japan

[21] Appl. No.: 534,149

[22] Filed: Sep. 21, 1983

[30] Foreign Application Priority Data

Sep. 24, 1982 [JP] Japan .................. 57-166303

[51] Int. Cl.$^3$ ............................. C08K 3/40; C08K 3/26
[52] U.S. Cl. .................................... 524/427; 524/494; 524/514; 525/184
[58] Field of Search ............... 524/514, 494, 427; 525/184

[56] References Cited

U.S. PATENT DOCUMENTS

| 3,652,509 | 3/1972 | Tsuda et al. | 528/339 |
|---|---|---|---|
| 3,962,524 | 6/1976 | Miyamoto et al. | 428/288 |
| 3,968,071 | 7/1976 | Miyamoto et al. | 525/432 |
| 3,974,234 | 8/1976 | Brinkmann et al. | 525/942 |
| 4,014,957 | 3/1977 | Kirsch et al. | 525/425 |
| 4,018,746 | 4/1977 | Brinkmann et al. | 528/338 |
| 4,098,860 | 7/1978 | Etou et al. | 525/432 |
| 4,120,928 | 10/1978 | Furakawa et al. | 264/171 |
| 4,278,779 | 7/1981 | Nakagawa et al. | 525/432 |
| 4,296,216 | 10/1981 | Sakano et al. | 525/66 |
| 4,314,929 | 2/1982 | Mahoney | 524/514 |

FOREIGN PATENT DOCUMENTS 73036 8/1982 European Pat. Off. .

OTHER PUBLICATIONS

Chem. Abstract 91-211929 (b), Lipatov et al. (1979).
Derwent Abstract 63331 D/35 (7-1981).
Derwent Abstract 29200 W/18 (4-1975).

*Primary Examiner*—Herbert J. Lilling
*Attorney, Agent, or Firm*—Wenderoth, Lind & Ponack

[57] ABSTRACT

A resin composition for molding materials, said composition comprising
(I) 100 parts by weight of a resin composition composed of
 (A) 5 to 95 parts by weight of a polyamide resin composed of 1 to 99% by weight of a polyamide resin obtained from xylylenediamine and an alpha, omega-linear aliphatic dibasic acid and 99 to 1% by weight of nylon 66, and
 (B) 95 to 5 parts by weight of a styrene-acrylonitrile copolymer containing 5 to 50 mole % of acrylonitrile as a copolymer component, and
(II) 5 to 150 parts by weight of an inorganic filler.

6 Claims, No Drawings

RESIN COMPOSITION FOR MOLDING MATERIALS

FIELD OF THE INVENTION

This invention relates to a resin composition for molding materials having mechanical properties, chemical resistance, thermal properties, dimensional stability and coatability in a very well balanced state.

BACKGROUND OF THE INVENTION

Polyamide resins (to be abbreviated hereinafter as "MX nylon") synthesized from xylylenediamines composed mainly of m-xylylenediamine and alpha, omega-linear aliphatic dibasic acids have attracted continued industrial interest as high-modulus fibers or biaxially stretched films. Since in their non-stretched state, they have the property of becoming brittle and being broken at ordinary temperatures and have poor impact strength, no industrial value has long been found in their non-stretched products.

Miyamoto et al. found that the above defect could be remedied by blending glass fibers, etc. with MX nylon, and proposed in U.S. Pat. No. 3,962,524 a polyamide molding composition comprising MX nylon and glass fibers as a molding material having excellent chemical, thermal and mechanical properties. Miyamoto et al., in order to remove the defect of the poor operability of the above molding composition in an molding operation, further proposed a polyamide molding composition comprising an admixture of glass fibers, nylon 66 and MX nylon in U.S. Pat. No. 3,968,071. Injection-molded articles obtained from this molding composition still have the defect of great warpage, and when these molded articles are coated with a high-temperature curable paint such as an alkyd paint, the adhesion of the coated film to the molded articles is poor. These defects still remained uneliminated.

On the other hand, an acrylonitrile-styrene copolymer (to be abbreviated hereinafter as "AS resin") has recently attracted interest as a transparent material comparable to polystyrene, polycarbonate, polymethacrylate, etc. because in addition to its high transparency, it has mechanical properties, chemical resistance and stress cracking resistance in a relatively well balanced state as an industrial material. However, for application to machine parts, its impact strength, chemical resistance and thermal resistance are still insufficient. Glass fiber-reinforced AS resin has considerably improved strength characteristics but even when it has a high fiber content of about 20%, it has a heat distortion temperature of only a little over 100° C. Because of such a low heat distortion temperature of the AS resin, it is impossible to coat its molded articles with high-temperature curable paints.

SUMMARY OF THE INVENTION

The present inventors have found that a molding material having chemical resistance, mechanical properties, thermal properties, dimensional stability and coatability in a very well balanced state can be obtained by further incorporating an inorganic filler such as glass fibers and calcium carbonate into a resin mixture composed mainly of an AS resin, MX nylon and nylon 66.

According to this invention, there is provided a resin composition for molding materials, said composition comprising (I) 100 parts by weight of a resin composition composed of
 (A) 5 to 95 parts by weight of a polyamide resin composition composed of 1 to 99% by weight, preferably 55 to 99% by weight, of a polyamide resin (MX nylon) obtained from xylylenediamine and an alpha, omega-linear aliphatic dibasic acid and 99 to 1% by weight, preferably 45 to 1% by weight, of nylon 66, and (B) 95 to 5 parts by weight of a styreneacrylonitrile copolymer (AS resin) containing 5 to 50 mole %, preferably 10 to 30 mole %, of acrylonitrile as a copolymer component, and
(II) 5 to 150 parts by weight of an inorganic filler.

DETAILED DESCRIPTION OF THE INVENTION

The molding resin composition of this invention comprises 100 parts by weight of the resin composition (I) and 5 to 150 parts by weight of the inorganic filler (II), and the resin composition (I) is composed of (A) 5 to 95 parts by weight of a polyamide resin composition and (B) 95 to 5 parts by weight of AS resin.

The polyamide resin composition (A) is composed of 1 to 99% by weight, preferably 55 to 99% by weight of MX nylon, and 99 to 1% by weight, preferably 45 to 1% by weight, of nylon 66. Nylon 66 is polyhexamethylene adipamide obtained by polycondensation between hexamethylenediamine and adipic acid. The MX nylon is a polyamide resin synthesized by polycondensation between m-xylylenediamine alone or a diamine mixture composed of at least 60% by weight of m-xylylenediamine and not more than 40% by weight of p-xylylenediamine and an alpha, omega-linear aliphatic dibasic acid having 6 to 12 carbon atoms, such as adipic acid, sebacic acid, suberic acid, undecanedioic acid or dodecanedioic acid. In view of the balance of the properties of molded articles and moldability, adipic acid is especially preferred among the alpha,omega-linear aliphatic dibasic acids.

As the inorganic filler (II), there can be used ordinary inorganic fillers such as glass fibers, glass beads, carbon fibers, metal fibers and calcium carbonate. Generally, when glass fibers are used as the filler, molded articles having excellent mechanical properties such as high tensile strength, tensile elongation, flexural strength and impact strength are obtained. When calcium carbonate is used alone or together with glass fibers, there can be obtained molded articles having less molding strain than in the case of using glass fibers alone.

The molding resin composition of this invention is generally produced by melting and pelletizing the components in an extruder at a temperature 5° to 50° C. higher than the melting point of the polyamide resin.

The molding composition of this invention may include at least one ordinary additive generally used in compositions of this kind, such as stabilizers against deterioration by oxidation, heat and ultaviolet light, nucleating agents, plasticizers, fire retardants, antistatic agents, and lubricants.

In the molding resin composition of this invention, the AS resin has moderate affinity for the polyamide resin composition containing MX nylon, and it has been found that by blending an inorganic filler such as glass fibers and calcium carbonate with these resins, a molding material having chemical resistance, mechanical properties, thermal properties, dimentional stability and coatability in a very well balanced state can be obtained.

The following Examples and Comparative Examples illustrate the present invention in greater detail. The various abbreviations used in these examples have the following meanings.

Nylon MXD6: a polyamide resin from m-xylylenediamine and adipic acid
AS resin A: a copolymer of acrylonitrile and styrene (mole ratio 27:73)
AS resin B: a copolymer of acrylonitrile and styrene (mole ratio 13:87)
AS resin C: a copolymer of acrylonitrile and styrene (mole ratio 30:70).

EXAMPLE 1

Twenty parts by weight of AS resin A, 35 parts by weight of nylon MXD6, 5 parts by weight of nylon 66 and 40 parts by weight of glass fibers (3 mm chopped strands) were mixed by a mixer, and melted and mixed in a single screw extruder at a cylinder temperature of 270° C. The mixture was cooled with water and pelletized. Test specimens were molded from the pellets, and tested for various properties. The results are shown in Table 1.

The testing methods were as follows:
Tensile strength: ASTM D 638 (20° C. in the absolutely dry state)
Tensile elongation: ASTM D 638 (20° C. in the absolutely dry state)
Tensile modulus: ASTM D 638 (20° C. in the absolutely dry state)
Flexural strength: ASTM D 790 (20° C. in the absolutely dry state)
Flexural modulus: ASTM D 790 (20° C. in the absolutely dry state)
Izod impact strength: ASTM D 256 (20° C. in the absolutely dry state)
Heat distortion temperature: ASTM D 648 (264 psi)
Specific gravity: ASTM D 792 (20° C. in the absolutely dry state)
Molding warpage: A disk, 1/16 inch in thickness and 4 inches in diameter, was moled by a side gate, and the height of the warpage of the disk (the depth of the U-shaped valley) was measured.
Coatability: This represents the adhesion of a coated film to a molded article, and was measured by the following tape test.

A test specimen having a size of 70 mm × 70 mm × 3 mm was prepared from the molding resin composition. An amino-alkyd resin was coated to a thickness of 40 microns on the test specimen, and treated at 130° C. for 30 minutes to form a coated film.

Eleven cuts reaching the test specimen were formed on the coated film by a knife at intervals of 1 mm both longitudinally and transversely with the longitudinal and transverse cuts crossing each other at right angles. Thus, 100 squares were formed in an area of 1 $cm^2$ of the coated film. An adhesive tape was applied to the cut portion, and then peeled off. The proportion of the peeled film based on 1 $cm^2$ was calculated and expressed in %. Smaller percentage values show better coatability (adhesion of the coated film).

EXAMPLES 2, 5, 6, 7 and 8

These specimens of various resin compositions were prepared in accordance with the blending recipes shown in Table 1 and tested in the same way as in Example 1. The results are shown in Table 1.

EXAMPLE 3

AS resin B (25 parts by weight), 40 parts by weight of nylon MXD6, 5 parts by weight of nylon 66 and 30 parts by weight of the same glass fibers as used in Example 1 were mixed in a mixer, and then melted and mixed in a single screw extruder at a cylinder temperature of 270° C. Then, the mixture was cooled with water and pelletized. Test specimens were molded from the pellets and tested. The results are shown in Table 1.

EXAMPLE 4

AS resin C (20 parts by weight), 35 parts by weight of nylon MXD6, 5 parts by weight of nylon 66 and 40 parts by weight of the same glass fibers as used in Example 1 were mixed by a mixer, and then melted and mixed in a single screw extruder at a cylinder temperature of 270° C. The mixture was cooled with water and pelletized. Test specimens were molded from the pellets and tested. The results are shown in Table 1.

COMPARATIVE EXAMPLES 1 to 4

A composition composed of AS resin A and glass fibers and a composition composed of AS resin A and a mixture of glass fibers and calcium carbonate were tested in Comparative Examples 1 and 3. A composition composed of nylon MXD6, nylon 66 and glass fibers and a composition composed of nylon MXD6, nylon 66 and a mixture of glass fibers and calcium carbonate were tested in Comparative Examples 2 and 4. The results are shown in Table 1.

Since in Comparative Examples 1 and 3, the compositions had low heat distortion temperatures, the coatability test could not be conducted.

TABLE 1

| Item | | Unit | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Blending recipe | Nylon MXD6 | Wt % | 35 | 25 | 40 | 35 | 20 | 20 | 10 | 30 | 0 | 40 | 0 | 55 |
| | Nylon 66 | Wt % | 5 | 5 | 5 | 5 | 5 | 5 | 5 | 5 | 0 | 5 | 0 | 5 |
| | AS resin A | Wt % | 20 | 20 | 0 | 0 | 25 | 20 | 30 | 10 | 45 | 0 | 70 | 0 |
| | AS resin B | Wt % | 0 | 0 | 25 | 0 | 0 | 0 | 0 | 0 | 0 | 0 | 0 | 0 |
| | AS resin C | Wt % | 0 | 0 | 0 | 20 | 0 | 0 | 0 | 0 | 0 | 0 | 0 | 0 |
| | Glass fibers | Wt % | 40 | 50 | 30 | 40 | 20 | 15 | 15 | 15 | 15 | 15 | 30 | 40 |
| | Calcium carbonate | Wt % | 0 | 0 | 0 | 0 | 30 | 40 | 40 | 40 | 40 | 40 | 0 | 0 |
| Extruding conditions | Cylinder temperature | °C. | 270 | 270 | 270 | 270 | 270 | 270 | 270 | 270 | 190 | 270 | 190 | 270 |
| | Rotating speed of screw | RPM | 80 | 80 | 80 | 80 | 80 | 80 | 80 | 80 | 80 | 80 | 80 | 80 |
| Injection molding conditions | Resin temperature | °C. | 255 | 255 | 255 | 255 | 255 | 255 | 255 | 255 | 175 | 255 | 175 | 255 |
| | Mold temperature | °C. | 130 | 130 | 130 | 130 | 130 | 130 | 130 | 130 | 70 | 130 | 70 | 130 |
| | Injection time | sec. | 15 | 15 | 15 | 15 | 15 | 15 | 15 | 15 | 15 | 15 | 15 | 15 |
| | Cooling time | sec. | 15 | 15 | 15 | 15 | 15 | 15 | 15 | 15 | 15 | 15 | 15 | 15 |
| Test results | Specific gravity | | 1.47 | 1.58 | 1.38 | 1.46 | 1.58 | 1.67 | 1.65 | 1.73 | 1.60 | 1.75 | 1.30 | 1.53 |
| | Heat distortion temperature | °C. | 219 | 223 | 205 | 215 | 187 | 203 | 150 | 214 | 103 | 219 | 110 | 230 |

TABLE 1-continued

| Item | Unit | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|
| Tensile strength | kg/cm$^2$ | 1980 | 2050 | 1350 | 1850 | 1150 | 1040 | 970 | 1210 | 760 | 1330 | 1330 | 2240 |
| Tensile elongation | % | 1.4 | 1.4 | 1.5 | 1.5 | 1.1 | 1.1 | 1.1 | 1.2 | 1.1 | 1.3 | 2.6 | 2.0 |
| Tensile modulus | 10$^3$kg/cm$^2$ | 136 | 216 | 120 | 128 | 142 | 123 | 123 | 131 | 96 | 138 | 97 | 147 |
| Flexural strength | kg/cm$^2$ | 2550 | 2520 | 1950 | 2400 | 1520 | 1580 | 1410 | 1860 | 1210 | 1960 | 1600 | 3040 |
| Flexural modulus | 10$^3$kg/cm$^2$ | 124 | 150 | 115 | 123 | 112 | 128 | 123 | 133 | 85 | 134 | 90 | 137 |
| Izod impact strength (¼″ notched) | kg-cm/cm | 8.0 | 8.5 | 7.0 | 8.3 | 5.9 | 6.1 | 5.5 | 6.5 | 3.4 | 6.0 | 5.8 | 8.9 |
| Molding was page | mm | 3.5 | 3.9 | 3.1 | 3.3 | 0.98 | 0.71 | 0.62 | 0.95 | 0.53 | 4.3 | 0.85 | 4.5 |
| Coatubility | % | 0 | 0 | 0 | 0 | 0 | 0 | 0 | 0 | — | 60–100 | — | 60–100 |

What is claimed is:

1. A resin composition for molding materials, said composition comprising
(I) 100 parts by weight of a resin composition composed of
  (A) 5 to 95 parts by weight of a polyamide resin composed of 1 to 99% by weight of a polyamide resin obtained from xylylenediamine and an alpha, omega-linear aliphatic dibasic acid and 99 to 1% by weight of nylon 66, and
  (B) 95 to 5 parts by weight of a styreneacrylonitrile copolymer containing 5 to 50 mole % of acrylonitrile as a copolymer component, and
(II) 5 to 150 parts by weight of an inorganic filler.

2. The composition of claim 1 wherein the polyamide resin composition (A) is composed of 55 to 99% by weight of the polyamide resin obtained from xylylenediamine and an alpha, omega-linear aliphatic dibasic acid and 45 to 1% by weight of nylon 66.

3. The composition of claim 1 wherein the styreneacrylonitrile copolymer contains 10 to 30 mole % of acrylonitrile as a copolymer component.

4. A resin composition in accordance with claim 1 wherein the inorganic filler is composed of glass fibers.

5. A resin composition in accordance with claim 1 wherein the inorganic filler is composed of calcium carbonate.

6. A resin composition in accordance with claim 1 wherein the inorganic filler is composed of glass fibers and calcium carbonate.

* * * * *